United States Patent [19]

Arnold

[11] Patent Number: 4,553,606
[45] Date of Patent: Nov. 19, 1985

[54] SOD CUTTING MACHINE HAVING SPLIT UNDERCUTTING BLADE

[75] Inventor: William T. Arnold, Sutton West, Canada

[73] Assignee: Brouwer Turf Equipment Limited, Keswick, Canada

[21] Appl. No.: 439,254

[22] Filed: Nov. 4, 1982

[30] Foreign Application Priority Data

Jan. 25, 1982 [CA] Canada ................................ 394835

[51] Int. Cl.⁴ ............................................. A01B 45/04
[52] U.S. Cl. ......................................... 172/19; 172/40
[58] Field of Search ...................... 172/19, 20, 40, 41, 172/42, 43, 54.5, 84, 88, 102

[56] References Cited

U.S. PATENT DOCUMENTS

| | | | |
|---|---|---|---|
| 2,702,502 | 2/1955 | Rogneby | 172/19 |
| 2,737,094 | 3/1956 | Jackson | 172/40 UX |
| 3,025,618 | 3/1962 | Croucher | 172/42 X |
| 3,747,686 | 7/1973 | Beck | 172/20 |
| 4,351,396 | 9/1982 | Moulton | 172/40 |

FOREIGN PATENT DOCUMENTS

926993  5/1963  United Kingdom ................. 172/19

Primary Examiner—Richard T. Stouffer
Attorney, Agent, or Firm—Rogers, Bereskin & Parr

[57] ABSTRACT

A portable sod cutting machine having a light weight tubular frame and a split cutting knife to reduce vibration. The split cutting knife includes two horizontal undercutting blades facing each other and substantially touching each other, and two side cutting blades one extending upwardly from each side of each undercutting blade. The undercutting knives are reciprocated oppositely by a common drive shaft having eccentric stub shafts connected to crank arms which are connected to the cutting knives. Swinging handles are hingedly connected to the rear of the machine and swing between a normal rearwardly extending operating position and a storage position in which the handles project forwardly one on each side of the frame.

7 Claims, 13 Drawing Figures

FIG. 9

SOD CUTTING MACHINE HAVING SPLIT UNDERCUTTING BLADE

This invention relates to a machine for cutting sod and the like, having a split blade.

Sod cutters are used to undercut a strip of sod and to cut the edges of the sod strip, so that the resultant strip can be rolled up and removed for use elsewhere. Such sod cutters are usually large heavy machines held by a tractor or self-propelled, but small sod cutters are marketed for use in small areas or in small operations where the use of a large expensive machine would not be worthwhile.

Virtually all sod cutters presently used employ a blade which reciprocates back and forth at high speed as it undercuts a strip of sod, in order to produce a thin evenly cut strip. The vibrations produced by the movement of the reciprocating blade are substantial, and in order to strengthen the machines and to reduce the vibrations, such small sod cutters have in the past been made of heavy structural members and have carried considerable weight, to damp the vibrations. Attempts have been made to build lighter machines, but these machines have literally torn themselves out of their operator's hands. The weight and bulk required to withstand and damp the vibrations have made small sod cutters expensive, difficult to transport, and generally difficult to manage.

Accordingly, it is an object of the present invention to provide a machine for cutting sod and the like, in which vibration which can cause difficulty in guiding the machine has been reduced considerably. In one aspect the invention provides a machine for cutting sod and the like having:

(a) a frame adapted for travel forwardly along a path of travel,
(b) first and second cutting knives,
(c) each cutting knife having an elongated undercutting blade having a sharpened forward edge and inner and outer ends, and a side cutting blade connected to said outer end and extending substantially at right angles thereto, said side cutting blade also having a sharpened forward edge,
(d) means mounting said knives on said frame for reciprocation of said knives back and forth along said path of travel from a position in which said undercutting blades are aligned transversely and in a common substantially horizontal plane with said inner ends substantially touching each other and with said side cutting blades extending upwardly from said undercutting blades so that said undercutting and side cutting blades effectively form a single knife for undercutting and cutting the edges of a strip of sod,
(e) and drive means connected between said frame and said mounting means (d) for reciprocating said knives in opposite directions, whereby to reduce vibration of said machine.

Further objects and advantages of the invention will appear from the following description, in which a preferred embodiment of a sod cutting machine according to the invention is described, taken together with the accompanying drawings in which.

Reference is now made to the drawings, which show a sod cutting machine generally indicated at 10 for travel along a path of travel indicated by arrow 12. The machine includes a frame 14 formed from steel tubing. The frame 14 includes two laterally spaced lower side frame members 16a, 16b, each extending generally along the path of travel, and two laterally spaced upper side frame members 18a, 18b, each also extending generally along the path of travel. Each upper side frame member 18a, 18b is spaced above its associated lower side frame member 16a, 16b and is joined thereto by front and rear side struts 20a, 20b, 22a, 22b respectively. The lower side frame members 16a, 16b are joined together by lower front, intermediate rear cross struts 24, 26 and 28, while the upper side frame members 18a, 18b are joined together by intermediate and rear cross struts 30, 32. All the frame members and struts are welded together, except for the front side struts 20a, 20b which are integral with the upper side frame members 18a, 18b, and except for the lower front cross strut 24 which is integral with the lower side frame members 16a, 16b. Since all the frame members and cross struts described are formed from steel tubing, the result is a box-like frame which is very strong and relatively light in weight.

Mounted on the frame 14 are an engine 34, including an air cleaner 36, carburetor 38 and fuel tank 40, a pair of semi-pneumatic front wheels 42, a drive roller 44, a cutter assembly 46, and handles 48a, 48b for an operator.

Figures 1, 2:
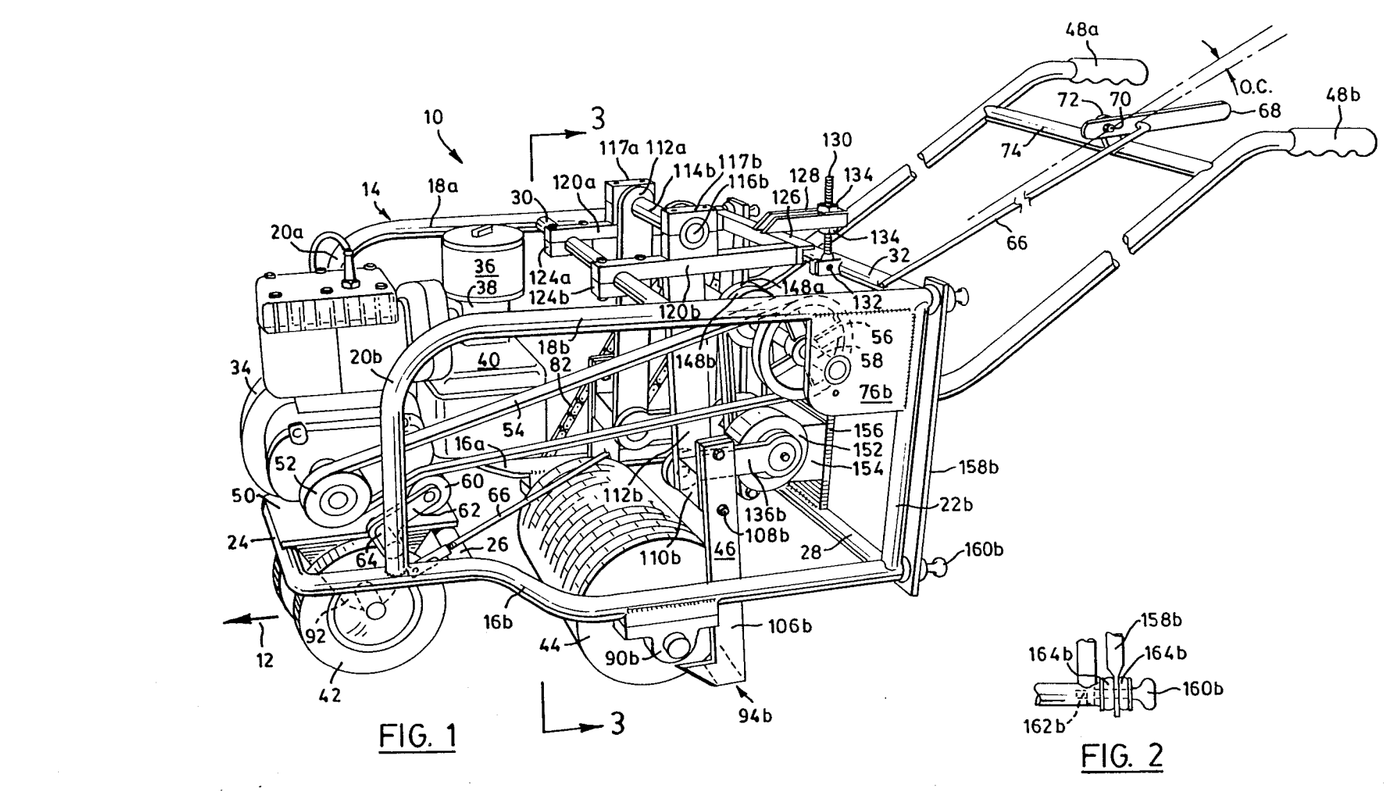
FIG. 1 is a perspective view of a sod cutting machine according to the invention.
FIG. 2 is a sectional view showing the manner in which the handle of the FIG. 1 machine is mounted.
Figure 5:
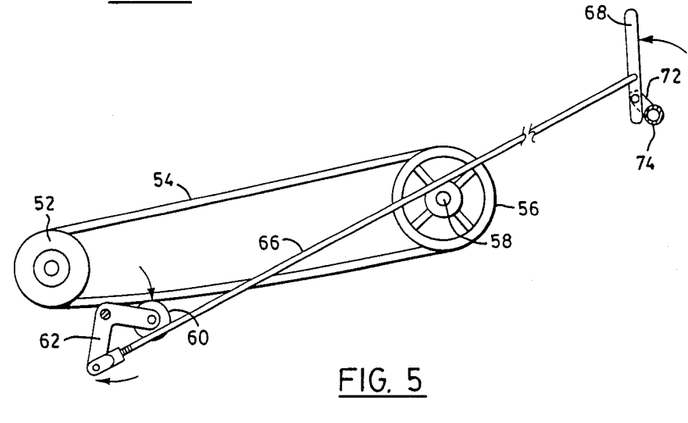
FIG. 5 is a diagrammatic view of the drive engagement mechanism of the FIG. 1 machine.
Figures 6, 7, 8:
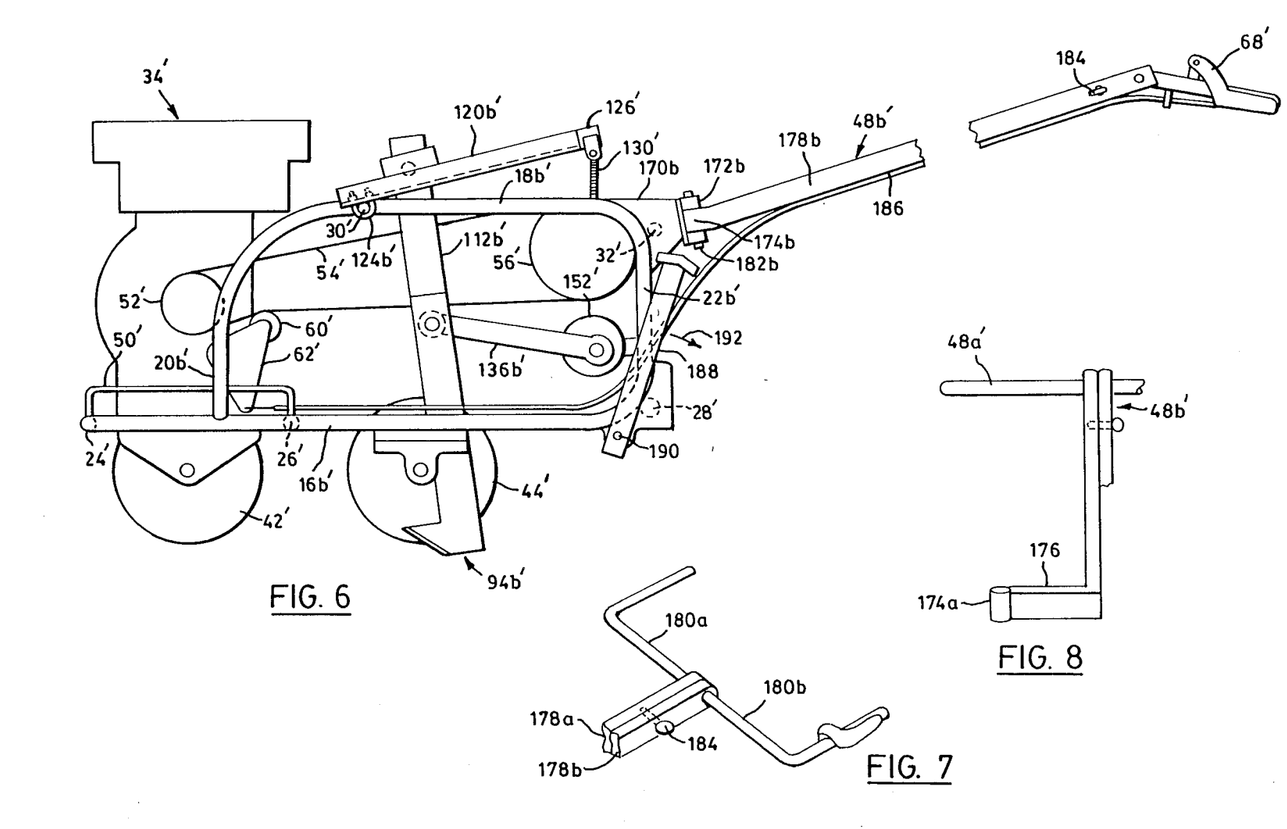
FIG. 6 is a side view of another embodiment of a sod cutting machine according to the invention, with swing-around handles.
FIG. 7 is a perspective view of a portion of the handles of the FIG. 6 machine.
FIG. 8 is an end view of a portion of the handles of the FIG. 6 machine.

The engine 34 is mounted on a horizontal plate 50 which is welded to the lower cross struts 24, 26. The engine includes an output drive pulley 52 which drives a belt 54 which in turn drives a pulley 56 mounted on a shaft 58 of the cutter assembly. The drive to shaft 58 is engaged and disengaged by an idler pulley 60 mounted on one end of a bell crank 62. The bell crank 62 is pivotally mounted on a short stub tube 64 projecting laterally from the front side strut 20b. The other end of the bell crank 62 is pivotally connected to a rod 66 which extends rearwardly and upwardly to an over-the-center drive engagement lever 68. Lever 68 is pivotally mounted at 70 on a projecting arm 72 located on a cross strut 74 which extends between the handles 48a, 48b. When the rod 66 is moved rearwardly by moving the lever 68 clockwise, as shown in FIGS. 1 and 5, to the overcenter position shown in FIG. 1, the bell crank 62 is rotated counterclockwise to the FIG. 1 position to tighten the belt 54 and engage the drive.

One end of drive shaft 58 is journalled in one side plate of a pair of side plates 76a, 76b, one welded in each corner where tubes 18a, 22a and 18b, 22b meet. The other end of drive shaft 58 extends into a speed reducing gear box 78 journalled in side plate 76a. Gear box 78 carries an output sprocket 80 which drives a roller drive chain 82. Chain 82 drives a sprocket 84 mounted on the end of axle 86, which in turn carries the drive roller 44. Axle 86 is mounted in bearings (not shown) in two pillow blocks 90a, 90b welded to the lower side frame members 16a, 16b. Roller 44 has a roughened surface so that it can propel the machine as well as support the rear of the machine. The front of the machine is supported by the front wheels 42, which are journalled in plates 92 welded to and extending downwardly from the engine mounting plate 50.

The cutter assembly 46, which is also operated by the drive shaft 58, includes two cutting knives 94a, 94b. The two knives are identical except that one is a mirror image of the other, and only knife 94a will be described. Knife 94a includes a flat laterally extending undercutting blade 96a having a sharpened front edge 98a and inner and outer ends 100a, 102a. respectively. A vertically oriented side cutting blade 104a is welded to the outer end 102a of the undercutting blade and has a sharpened front edge 105a sloping forwardly and upwardly. Blade 104a cuts an edge of the sod strip.

The cutting knives 94a, 94b are suspended by lower support arms 106a, 106b welded to the undercutting and side cutting blades. The suspension is such that as the knives 94a, 94b reciprocate back and forth as indicated by the arrows in FIG. 4, they move past a position in which the undercutting blades 96a, 96b are aligned transversely and in a common substantially horizontal plane with the inner ends 100a, 100b facing each other and substantially touching each other. The inner ends 100a, 100b do not of course actually touch each other, and the term "substantially touching each other" as used herein means that the ends are separated by only a very small clearance (typically about 0.5 mm). Typically the two undercutting blades 96a, 96b span a total width of about 13 inches (i.e. they are each about 6.5 inches long) but they can be made longer if desired. The height of the side cutting blades 104a, 104b is by contrast much smaller, typically not more than three inches and usually less.

The lower support arms 106a, 106b are secured by bolts 108a, 108b to inwardly extending blocks 110a, 110b which in turn are secured, either by welding or bolting, to upper support arms 112a, 112b. One of the upper support arms 112a is fixed to a pivot shaft 114a which is mounted in self-lubricated bearings 116a, 116b (FIG. 4A) in blocks 117a, 117b. The other arm 112b is fixed to a hollow tube 114b which is fitted over pivot shaft 114b and has inner self-lubricated bearings 118 so that it can rotate easily with respect to shaft 114b. The assembly is fitted with thrust bearings 119 (also self-lubricated) to withstand thrust loads. This arrangement provides a wide bearing support to bear the high impact loads that will be encountered by the cutting knives while maintaining the precise alignment of the cutting knives so that a uniform strip of sod is cut. The support arms 106a, 106b, 112a, 112b are all preferably made of high tensile strength steel so that if they are deflected e.g. by stones or the like, they will spring back to their proper positions.

The blocks 117a, 117b are mounted on forwardly and rearwardly extending swing arms 120a, 120b. The swing arms 120a, 120b are, at their front ends, secured by bolts to saddle blocks 124a, 124b to provide a pivotal mounting on upper cross strut 30. The rear ends of the swing arms 120a, 120b are joined together by a laterally extending flange member 126 to the center of which is welded a rearwardly projecting stub member 128. The stub member is adjustably supported by a bolt 130 pivotally mounted at 132 on the upper rear cross strut 32. The bolt 130 extends through a hole in the stub member 128 and is provided with two nuts 134 one above and one below the stub member 128. This allows the vertical position of the end of the stub member 128 to be adjusted, thereby allowing adjustment of the vertical height and the inclination of the cutting knives 94a, 94b relative to the bottom of the roller 44.

Figure 4:
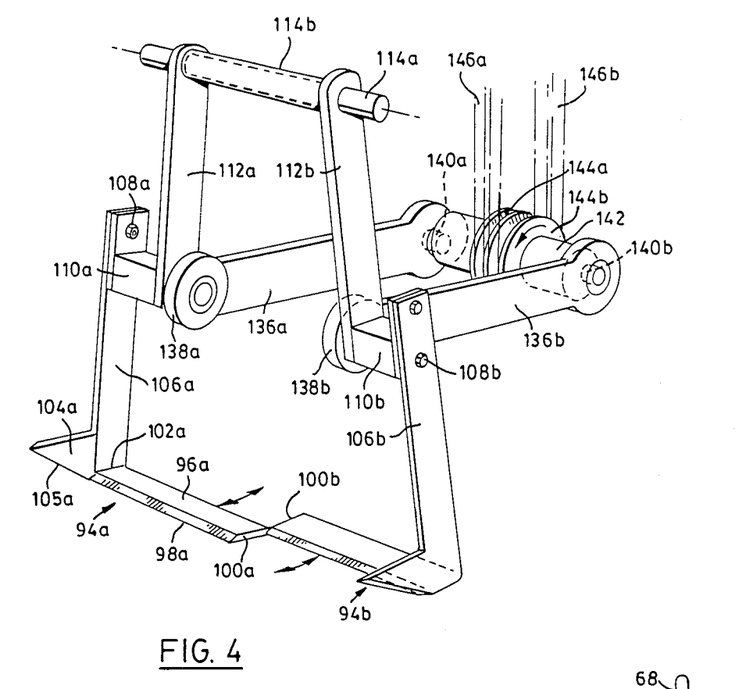
FIG. 4 is a diagrammatic view showing the mounting and driving of the cutting knives of the FIG. 1 machine.
Figure 4A:
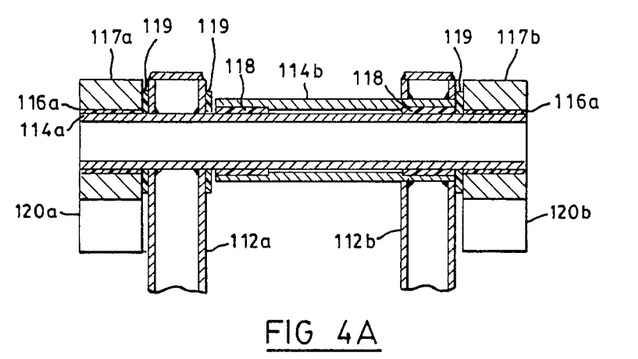
FIG. 4A is a sectional view showing details of the suspension of support arms for the knives of FIG. 4.

The cutting knives 94a, 94b are reciprocated oppositely as follows. As best shown in FIG. 4, crank arms 136a, 136b are mounted by bearings 138a, 138b to the lower ends of the upper support arms 112a, 112b and extend rearwardly therefrom. The crank arms 136a, 136b are mounted by eccentric stub shafts 140a, 140b to a lower drive shaft 142 having two pulleys 144a, 144b mounted thereon. From the pulleys 144a, 144b, two drive belts 146a, 146b extend upwardly to upper drive pulleys 148a, 148b mounted on the drive shaft 58.

Figure 3:
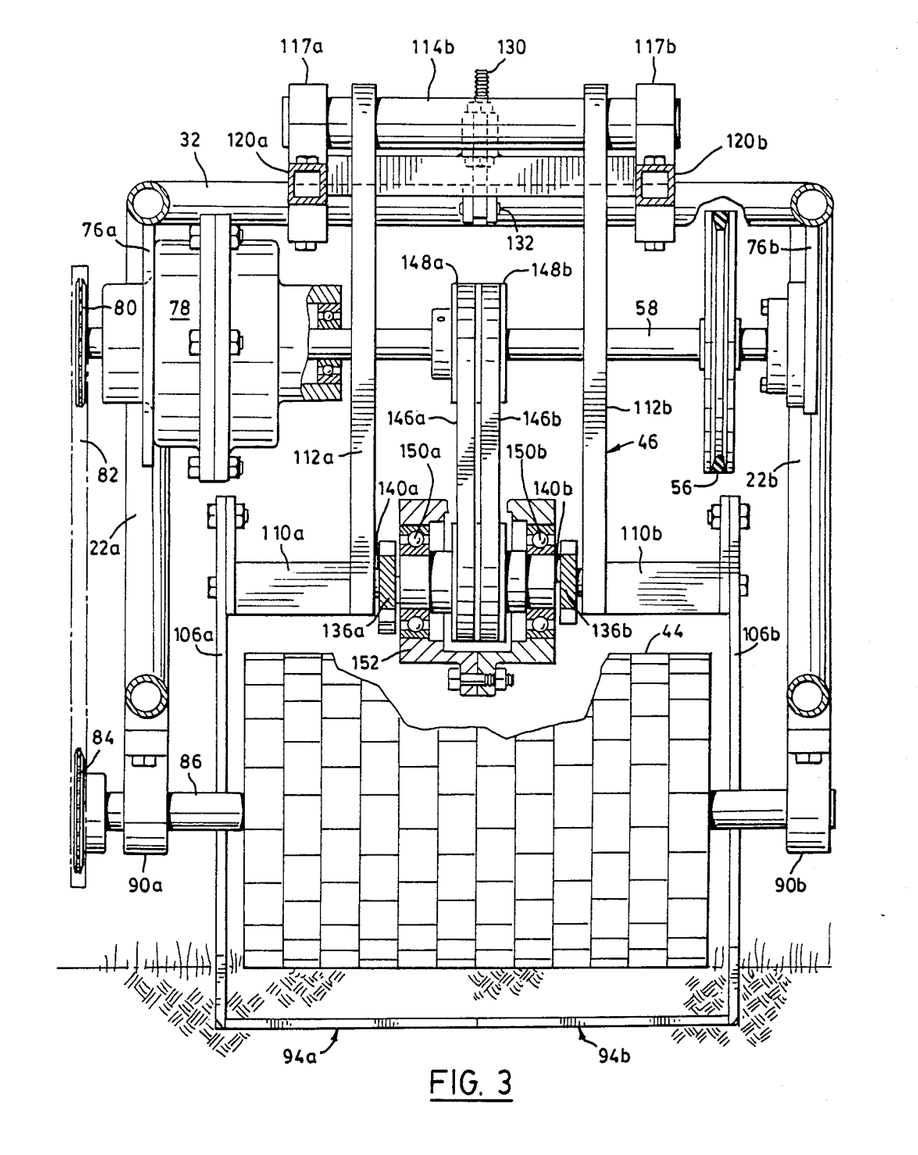
FIG. 3 is a view, partly in section, taken along lines 3—3 of FIG. 1.

The lower drive shaft 142 is mounted (see FIG. 3) by bearings 150a, 150b in a casing 152 having a rearwardly extending portion 154 which is secured by bolts, not shown, to a vertical plate 156 extending between the lower and upper rear cross struts 28, 32. As the lower drive shaft 142 rotates, the crank arms 136a, 136b are driven forwardly and rearwardly in opposite directions, as best shown in FIG. 3, to drive the cutting knives 94a, 94b in opposite directions. The directions are opposite because the eccentric stub shafts 140a, 140b are located 180 degrees out of phase. Thus, as the cutting knive 94a moves forwardly, the cutting knife 94b moves rearwardly, and vice versa. The oppositely reciprocating cutting knives drastically reduce vibration of the machine, since they tend to produce counteracting vibrations, and in addition roots and the like which can become entangled around a conventional single cutting blade tend to be cut and removed by the oppositely reciprocating blades. The split blade and opposite reciprocation also substantially reduce the power required of the engine 34, since only one cutting knife moves forwardly at a time (the cutting action occurs on the forward stroke). The smaller engine needed also helps to reduce the weight of the machine.

As shown in the drawings, the handles 48a, 48b are removably shock mounted to the frame as follows. Each handle 48a, 48b is welded to a vertical bar 158a, 158b. The bars 158a, 158b are mounted on the ends of the upper and lower side frame members 16a, 18a, 16b, 18b respectively by thumb screws 160a, 160b which screw into nuts 162a, 162b welded within the tubing of the side frame members. Resilient bushings 164a, 164b one each side of the bars 158a, 158b provide cushioning against vibrations reaching the handles.

Reference is next made to FIGS. 6 to 10, which show a modified sod cutting machine according to the invention. In FIGS. 6 to 10 primed reference numerals indicate parts corresponding to those of FIGS. 1 to 5.

The FIGS. 6 to 10 machine is essentially the same as the FIGS. 1 to 5 machine except for the handle arrangement and except for refinements of structural detail.

The major changes in structural detail are that the lower side frame member 16b' is now linear instead of being bent inwardly adjacent its front end, and it forms with the other side frame struts and members 22b', 18b' and 20b' a single smoothly curved continuous piece of tubing. Plate 50' is raised sightly above the cross struts 24', 26' and is welded thereto, and the saddle blocks 124a, 124b have been replaced by U-clamps, one of which is shown at 124b'. The stud member 128 has been eliminated; swing arms 120a, 120b have been extended slightly further rearwardly as indicated at 120b', and a downwardly projecting stub 166 has been welded to flange member 126' and is pivotally secured at 168 to screw 130'.

The major change in the FIGS. 6 to 10 machine is in the handle arrangement, which is as follows. As shown, two sturdy plates 170a, 170b are welded to the corners where each top side frame member 18a', 18b' joins its respective rear side strut 22a', 22b'. The plates 170a, 170b project rearwardly and each carries a sturdy hinge bushing 172a, 172b. The hinge bushings 172a, 172b are oriented in a generally vertical plane as viewed from above (FIG. 10) but slant forwardly and upwardly as viewed from the side.

Each handle 48a', 48b' includes (see particularly FIG. 8) a second bushing 174a, 174b to which is welded a laterally extending cross bar 176, 176b. A tubular handle support 178a, 178b is welded to and extends rearwardly and upwardly from the cross bar 176a, 176b respectively, and a tubular handle bar 180a, 180b is welded to and extends outwardly and then rearwardly from the handle support 178a, 178b respectively.

The handles are assembled to the machine by inserting the bushings 174a, 174b into the bushings 172a, 172b (like a door hinge) and inserting pins 182a, 182b through the two sets of bushings. Cotter pins (not shown) secure the pins 182a, 182b in position. When the handles are so mounted, they are swingable between the operating position shown in FIGS. 6 to 8 and the storage position shown in FIGS. 9 and 10.

In their operating position, the handles 48a', 48b' extend upwardly and rearwardly from the hinge pins 182a, 182b as shown and are held together by a thumb screw 184 which extends through a hole in one handle support 178a into a tapped hole in the other handle support 178b. For storage of the handles so that the machine can be transported from one location to another, the thumb screw 184 is removed and the handles are swung outwardly in opposite directions to the storage position shown in FIGS. 9 and 10. In this position each handle support 178a, 178b lies in a horizontal position and extends forwardly one on each side of the frame 14 near the top thereof. The handle bars 180a, 180b face inwardly toward each other and lie against each other as shown in FIG. 10, and are held together by the same thumb screw 184 which now extends through a hole in one of the handle bars 184b and into a tapped hole in the other handle bar 184a.

Figure 9:
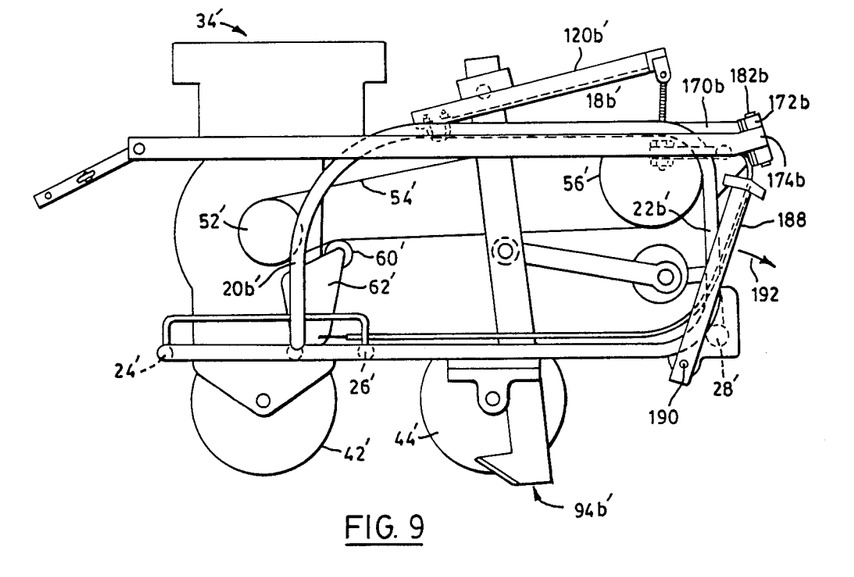
FIG. 9 is a view similar to that of FIG. 6 but showing the handles in a stored position.
Figure 10:
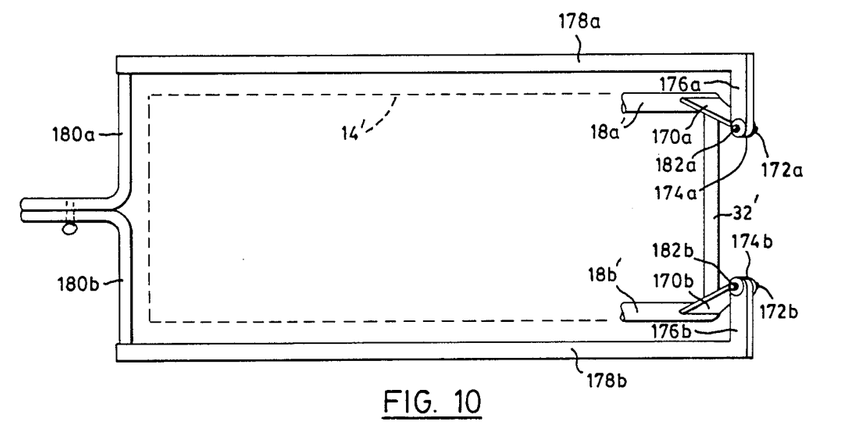
FIG. 10 is a diagrammatic top view of the FIG. 9 machine.

In the storage position of the handle bars shown in FIGS. 9 and 10, the handles 48a', 48b' can be used to lift the machine for transport. The hinge pins and bushings are made sufficiently strong so that the handles will serve this purpose without any additional front supports. The angle of the hinge bushings 172a, 172b with respect to the horizontal, and the angle at which the handle supports 178a, 178b project upwardly from the hinges, are made such that when the handles are swung to the storage position, the handle supports lie in a horizontal plane as mentioned, to facilitate transport of the machine.

Since the handles 48a', 48b' have been made swingable, the rod 66 has been replaced by a conventional wire and cable 186 connected to the bell crank 62' at one end and connected to the lever 68' at its other end.

Although the handle arrangement shown in FIGS. 6 to 10 does not include any shock absorbing means, it is found that even with the very light tubular frame shown, no shock absorber is needed since the split blade cutting knife significantly reduces vibration of the machine. If a one piece cutting knife were used, then the same handle arrangement could be used but additional weight and strength would have to be built into the machine.

The machine shown in FIGS. 6 to 10 also includes a pair of swingable feet 188, one at each side of the rear of the frame and each pivotally mounted at 190 to the lower rear portion of the frame. The feet 188 are normally held by fastening means (not shown) in the position shown in FIGS. 6 to 9 but can be swung downwardly in the direction of arrow 192 when the machine is being transported for example in the back of a pickup truck. The feet 118 in their down position extend rearwardly and downwardly and brace the machine against movement cause by vibration of the vehicle in which the sod cutting machine is being transported.

It will be appreciated that although each cutting knife 94a, 94b has been shown as a one-piece unit, each knife can instead be fabricated from several pieces (e.g. the side cutting blade can be separate) bolted together. In addition, although the machine has been described as a sod cutter, it can be used for other purposes, e.g. for shallow cultivation and weed removal in gardens. (For this purpose rearwardly extending laterally spaced short spring steel fingers can be welded to the upper surfaces of the undercutting blades 96a, 96b).

Figure 11:
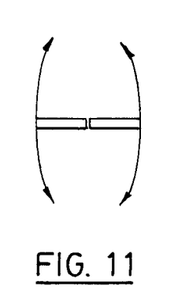
FIGS. 11 and 12 are diagrammatic views showing alternative paths of movement for the cutting knives.
Figure 12:
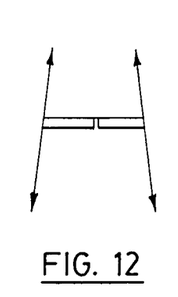

Also if desired, the cutting knives may be mounted for movement each in a shallow arc, as shown in exaggerated form in FIG. 11, or in diverging paths, as shown in exaggerated form in FIG. 12. In both cases the paths of the cutting knives overlap, to improve the cut and help remove roots which might become tangled in the blades. In either case the angle or the arc will be very shallow, so that the edges will still be reasonably cleanly cut and so that the driving and supporting mechanism for the blades need not be made unduly complex.

Although the split cutting blade feature has been described in connection with a small portable cutter, it may also be used in a large sod harvester, where it will still reduce vibration and will also reduce the power required for cutting.

Although the swing away handles shown in FIGS. 6 to 10 have been described for use with a cutting machine, they can also be used with other implements requiring rearwardly or forwardly extending handles for guidance (e.g. snow blowers, large lawn mowers, and the like).

I claim:
1. A machine for cutting a thin strip of sod, said machine having:
   (a) a frame adapted for travel forwardly along a path of travel,
   (b) first and second cutting knives,
   (c) each cutting knife having an elongated undercutting blade having a sharpened forward edge, an upper surface, a lower surface, and inner and outer ends, and a side cutting blade connected to said outer end and extending substantially at right angles thereto, said side cutting blade also having a sharpened forward edge, (d) means mounting said knives on said frame for reciprocation of said knives back and forth along said path of travel from a position in which said undercutting blades are aligned transversely and in a common substantially horizontal plane with said inner ends substantially touching each other and with said upper surfaces aligned horizontally with each other and with said lower surfaces aligned horizontally with each other and with said side cutting blades extending upwardly from said undercutting blades so that said undercutting and side cutting blades effectively form a single knife for undercutting and cutting the edges of a strip, (e) and drive means connected between said frame and said mounting means (d) for reciprocating said knives in opposite directions, whereby to reduce vibration of said machine.

2. A machine according to claim 1 wherein said mounting means (d) includes a pair of support arms, one connected to and extending upwardly from each side cutting blade, and said drive means includes a pair of crank arms one connected to each of said support arms, and common drive shaft means having eccentric stub shafts extending from each end thereof, one stub shaft connected to each of said crank arms.

3. A machine according to claim 1 and having a handle for guiding said machine, and further including shock absorbing means connecting said handle to said frame.

4. A machine according to claim 1 wherein said frame comprises two lower side frame members spaced laterally apart and two upper side frame members spaced laterally apart one spaced above and associated with each lower side frame members, each of said side frame members having a rear end, a lower cross strut joining said lower side frame members adjacent the rear ends thereof, an upper cross strut joining said upper side frame members adjacent the rear ends thereof, a pair of side struts joining each associated pair of upper and lower side frame members adjacent the rear ends thereof, and further cross struts joining said side frame members forwardly of said rear ends, said side frame members and said cross struts all being of tubular metal.

5. A machine according to claim 4 wherein said mounting means (d) comprises a said cross strut extending between said upper side frame members, a pair of laterally spaced swing arms pivotally mounted on said last mentioned cross strut and extending along said path of travel therefrom and having free ends remote from said last mentioned cross strut, adjustable support means supporting said free ends from another said cross strut for adjusting the inclination with respect to the horizontal of said swing arms, and a pair of support arm means one pivotally mounted on each of said swing arms and extending downwardly and connected to a said side cutting blade, said drive means being connected to said support arm means.

6. A machine according to claim 5 wherein said drive means includes a pair of crank arms one connected to each of said support arm means, and common drive shaft means having eccentric stub shafts extending from each end thereof, one stub shaft connected to each of said crank arms.

7. A machine according to claim 1 wherein said means (d) includes a cross shaft pivotally mounted above said cutting knives, an elongated tube fitted over said cross shaft coaxially therewith and rotatable thereon, a first downwardly extending support arm fixed to said cross shaft, a second downwardly extending support arm fixed to said tube, and means supporting one of said knives from said first support arm and supporting the other of said knives from said second support arm.

* * * * *